US006868214B1

(12) United States Patent
Sakata et al.

(10) Patent No.: US 6,868,214 B1
(45) Date of Patent: Mar. 15, 2005

(54) OPTICAL WAVEGUIDE, METHOD OF FABRICATING THE WAVEGUIDE, AND OPTICAL INTERCONNECTION DEVICE USING THE WAVEGUIDE

(75) Inventors: Hajime Sakata, Kanagawa (JP); Takayuki Yagi, Kanagawa (JP); Toshihiko Ouchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 499 days.

(21) Appl. No.: 09/626,740

(22) Filed: Jul. 26, 2000

(51) Int. Cl.[7] ............................................. G02B 6/22
(52) U.S. Cl. ......................................................... 385/129
(58) Field of Search .......................... 385/1, 15, 16–23, 385/4–8, 147, 116, 129–132, 11–14

(56) References Cited

U.S. PATENT DOCUMENTS

| | | | | |
|---|---|---|---|---|
| 4,262,994 A | * | 4/1981 | Sheem | 385/129 |
| 5,131,060 A | | 7/1992 | Sakata | 385/2 |
| 5,140,149 A | | 8/1992 | Sakata et al. | 250/211 J |
| 5,220,573 A | | 6/1993 | Sakata et al. | 372/50 |
| 5,233,187 A | | 8/1993 | Sakata et al. | 250/227.24 |
| 5,333,216 A | | 7/1994 | Sakata et al. | 385/28 |
| 5,416,861 A | * | 5/1995 | Koh et al. | 385/14 |
| 5,479,544 A | | 12/1995 | Ono et al. | 385/37 |
| 5,544,268 A | * | 8/1996 | Bischel et al. | 385/4 |
| 5,617,439 A | * | 4/1997 | Kakimoto | 372/50 |
| 5,878,066 A | | 3/1999 | Mizutani et al. | 372/27 |
| 6,125,217 A | * | 9/2000 | Paniccia et al. | 385/14 |
| 6,208,791 B1 | * | 3/2001 | Bischel et al. | 385/129 |
| 2001/0053259 A1 | * | 12/2001 | Takeuchi et al. | 385/1 |

FOREIGN PATENT DOCUMENTS

JP          06-045584          2/1994

* cited by examiner

Primary Examiner—J. F. Duverne
(74) Attorney, Agent, or Firm—Fitzpatrick, Cella, Harper & Scinto

(57) ABSTRACT

An optical waveguide includes a partial cylindrical portion, and a plurality of end portions. The partial cylindrical portion has an elongated profile, and is formed of a material transparent to light propagating along the partial cylindrical portion. The end portion has an approximately partial spherical profile, smoothly joins the partial cylindrical portion, and is formed of the same material as the material of the partial cylindrical portion, so that the light propagates along the partial cylindrical portion and the end portions while repeating total reflections at a boundary surface contouring the partial cylindrical portion and the end portions.

25 Claims, 17 Drawing Sheets

OPTICAL WAVEGUIDE, METHOD OF FABRICATING THE WAVEGUIDE, AND OPTICAL INTERCONNECTION DEVICE USING THE WAVEGUIDE

BACKGROUND OF THE INVENTION

1. Field of the Invention

This invention relates to an optical waveguide suitable for use in integration with a light emitting device and/or a light receiving device, its fabrication method, and an optical interconnection device using the waveguide as optical wiring.

2. Related Background Art

An optical waveguide is composed of highly-transparent material with a line width in a range between about 2 to 3 $\mu$m and about 20 to 30 $\mu$m. The waveguide can achieve a variety of functions, such as optical transmission, optical branching/combining, wavelength filtering, wavelength multiplexing/demultiplexing, and optical modulation of light intensity or phase. Therefore, the waveguide is expected to be widely used in the fields of optical information transmission, such as optical communication and optical interconnection, and information processing, such as optical memory.

As a light emitting device for performing optical transmission through the waveguide, there has been recently developed a surface emitting laser, which emits light perpendicularly to its substrate, and which has a low threshold, and can be readily arrayed. A light emitting diode (LED) is also well known as a light emitting device whose fabrication cost is low and which can be readily implemented. The configuration of such a surface light-emitting-type device is similar to that of a light receiving device, such as a photodiode, which originally receives light at its surface. Therefore, those surface light emitting and receiving devices can be suitably combined, and are hence expected to be applied to an optical interconnection that optically connects boards, modules in a board, and large scale integration (LSI) chips to each other.

For those reasons, there is an increasing expectation for a waveguide, which can be readily mass-produced, and freely formed not only on a glass, quartz, or resin substrate, but also on a Si wafer, a semiconductor-on-insulator (SOI), or a compound semiconductor wafer, such as GaAs or InP. Naturally, the following fundamental characteristics are also required to the waveguide. Its transmission loss is low, its insertion loss is low, and the waveguide can be readily coupled to the light emitting or receiving device.

In an active display unit and a reading unit which employs electroluminescence (EL), LED, or the like, there has also been proposed the use of the waveguide. Further, in a promising new field of optical information processing, such as a super-parallel processing/operation, the waveguide is expected to be used for transfer of optical information or signals.

Conventionally, as a typical waveguide and its fabrication method, there is a method in which metal ions are diffused on a substrate of $SiO_2$, $LiNbO_3$, or the like through a selective mask to form a portion with an altered refractive index in the substrate. There is also a method in which a protruding portion is formed on the surface of a substrate by etching. In addition, there is a method in which a $SiO_2$ layer is formed on a Si wafer to fabricate a waveguide. There has recently proposed a method in which a resin, such as PMMA or polyimide, is coated on a substrate and a waveguide is formed on the substrate directly or using a patterned photoresist.

Thus, in the conventional methods, a waveguide is generally formed on the substrate by photolithography. As a result, a cross section of the waveguide is normally square or trapezoid. Further, when the waveguide is fabricated by etching, its side surface is considerably roughened, and hence, transmission loss occurs. Furthermore, when the waveguide is optically coupled to a light emitting or receiving device, the device must be precisely aligned with the end surface of the waveguide. Actually, it is typical to use one or two lenses between the device and the waveguide to improve the coupling efficiency. When the light emitting or receiving device is located above the waveguide, optical coupling is achieved by forming a 45-degree slanted mirror at the end surface of the waveguide, or forming a grating coupler. In those methods, however, the fabrication process is complex, and a sufficient coupling efficiency cannot be stably obtained.

An example of optical interconnection using a waveguide is disclosed in Japanese Patent Application Laid-Open No. 6(1994)-45584. In this structure, an optical wiring is formed in an integrated circuit by using the waveguide whose cross-sectional shape is square and whose end surface is a slantes surface for achieving an optical coupling to a light emitting or receiving device in a perpendicular direction. Accordingly, a lens for condensing propagating light needs to be additionally formed. Further, there is the limitation of a substrate for forming the waveguide therein since its fabrication method is conventional.

SUMMARY OF THE INVENTION

It is an object of the present invention to provide an optical waveguide whose transmission loss is low, whose efficiency of optical coupling to a light emitting or receiving device can be made large, which can be formed on a desired substrate, whose fabrication is easy, whose controllability is high, which can be mass-producible, and whose fabrication cost can be reduced, its fabrication method, and a simple, high-speed and wideband optical interconnection device constructed by combining the waveguide, a light emitting device and/or a light receiving device.

The present invention is generally directed to an optical waveguide which includes a partial cylindrical portion (the partial cylindrical shape means a three-dimensional shape which is formed by cutting a cylinder with a plane parallel to its central axis), and a plurality of end portions. The partial cylindrical portion has an elongated profile, and is formed of a material transparent to light propagating along the partial cylindrical portion. The end portion has an approximately partial spherical profile (the partial spherical shape means a three-dimensional shape which is formed by cutting a sphere with a plane), smoothly joins the partial cylindrical portion, and is formed of the same material as the material of the partial cylindrical portion, so that the light propagates along the partial cylindrical portion and the end portions while totally reflected at a boundary surface contouring the partial cylindrical portion and the end portions.

The following more specific structures are possible in the above fundamental structure.

The partial cylindrical portion may include a curved part having an approximately partial spherical profile smoothly joining a pair of straight partial cylindrical parts of the partial cylindrical portion.

The partial cylindrical portion may include a crossing part having an approximately partial spherical profile smoothly joining a plurality of straight partial cylindrical parts of the partial cylindrical portion.

The optical waveguide may further include a cladding portion, which is in contact with at least a part of a core consisting of the partial cylindrical portion and the end portions, and formed of a material whose refractive index is lower than a refractive index of the core.

The cladding portion may include a flat substrate, which is in contact with at least a part of a flat boundary surface of the core.

The partial cylindrical portion, the end portions and the substrate may be formed such that light incident perpendicularly to the substrate through the end portion can couple to and propagate along the partial cylindrical portion.

The partial cylindrical portion, the end portions and the substrate may be formed such that light propagating along the partial cylindrical portion can emerge perpendicularly to the substrate through the end portion.

The partial cylindrical portion and the end portions may be formed of a resin or a glass. Further, the partial cylindrical portion and the end portions may be formed on a resin substrate, a glass substrate, a quartz substrate, and a substrate of semiconductor such as Si, GaAs and InP. This substrate may be a flexible substrate, which is easily handled.

The present invention is further directed to an optical interconnection device which includes the above waveguide, and a substrate with at least one of a light emitting device and a light receiving device disposed on the substrate. The end portions of the waveguide are positioned at a portion of the substrate corresponding to a position at which the light emitting or receiving device is disposed.

The following more specific structures are possible in the above fundamental structure.

The light emitting device may be a surface emitting laser, such as a vertical cavity surface emitting laser (VCSEL), which is composed of semiconductor crystal and includes an active layer sandwiched between a pair of reflective mirrors.

The light emitting device may also be a light emitting diode (LED), which is composed of semiconductor crystal and includes one of a pn junction and a pin junction.

The light receiving device may be a pin photodiode, which is composed of semiconductor crystal, or a metal-semiconductor-metal (MSM) optical detector, which is composed of semiconductor crystal.

The substrate may be a semiconductor substrate on which an electronic circuit for driving and controlling the light emitting device is integrated, and with which the light emitting device is united.

The substrate may be a semiconductor substrate on which an electronic circuit for amplifying and controlling the light receiving device is integrated, and with which the light receiving device is.

The waveguide may optically connect semiconductor circuit chips each of which is formed on the substrate, or chip modules in which a plurality of semiconductor circuit chips are implemented. Further, the waveguide may perform an optical wiring on a board in which a semiconductor circuit chip and a chip module are mixedly implemented. The waveguide may optically connect boards in which a semiconductor circuit chip and/or a chip module are implemented.

The present invention is further directed to a method of fabricating the above waveguide, which includes a step of fabricating a mold, and a step of molding a waveguide material into the waveguide by using the mold.

The mold may be fabricated by a method which includes (a) a step of preparing a substrate at least a portion of which is electrically conductive, (b) a step of forming an insulating mask layer on the conductive portion of the substrate, (c) a step of forming an opening, at least a part of which is a slit-shaped portion, in the mask layer to expose the conductive portion of the substrate at the opening, (d) a step of performing electroplating using the conductive portion of the substrate as a cathode to deposit a partial cylindrical plated layer in the opening and on the mask layer, (e) a step of forming the mold on the substrate with the plated layer, and (f) a step of separating the mold from the substrate with the plated layer.

In the step (d), a size of the partial cylindrical plated layer can be controlled by controlling an electroplating time and temperature.

In the step (d), a sacrificial layer may be formed on the plated layer.

In the step (e), the mold may be formed by electroplating.

In the step (f), the mold may be separated from the substrate with the plated layer by removing the sacrificial layer, or by serially etching the substrate and the plated layer.

In the step (a), the substrate may be a Si wafer.

In the step (b), the mask layer may be formed of a photoresist.

In the step (c), the opening may be patterned corresponding to a profile of the waveguide.

The waveguide may be formed of a resin, or a glass material. Further, the waveguide may be formed on a resin substrate, a glass substrate, a quartz substrate, or a semiconductor substrate. In this case, the substrate may be a flexible substrate.

These advantages and others will be more readily understood in connection with the following detailed description of the more preferred embodiments in conjunction with the drawings.

DESCRIPTION OF THE PREFERRED EMBODIMENTS (First Embodiment)

Figure 1:
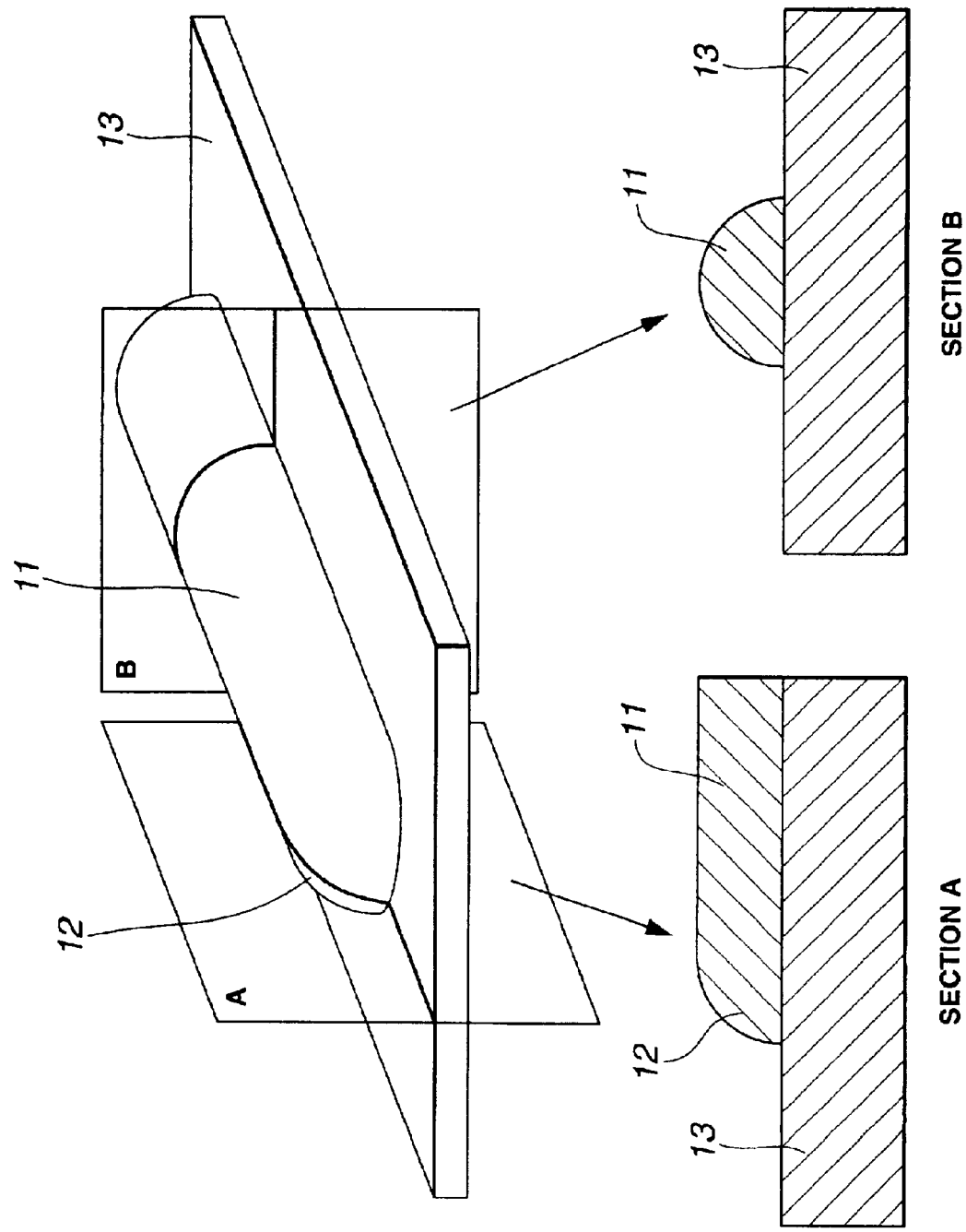
FIG. 1 is a view illustrating a typical configuration of an optical waveguide of the present invention.

A typical simple structure of an optical waveguide of the present invention is illustrated in FIG. 1. A waveguide 11 has a semicylindrical profile extending in a light propagating direction, and its light input/output portion (typically its end portion) 12 is shaped into a partial spherical profile or a profile similar to a partial sphere. The cylindrical surface of the waveguide 11 is smooth enough to greatly reduce its optical transmission loss. The waveguide 11 with the end portions 12 is formed on a cladded plate 13, whose refractive index is lower than that of the waveguide 11 and the end portions 12.

Figure 2:
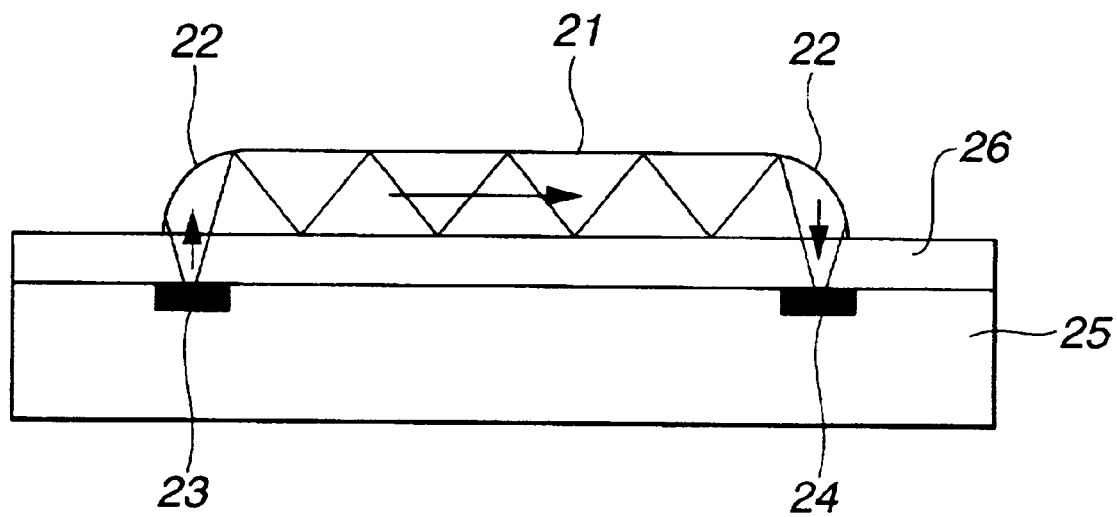
FIG. 2 is a cross-sectional view illustrating an optical interconnection device using a waveguide of the present invention.
Figure 3:
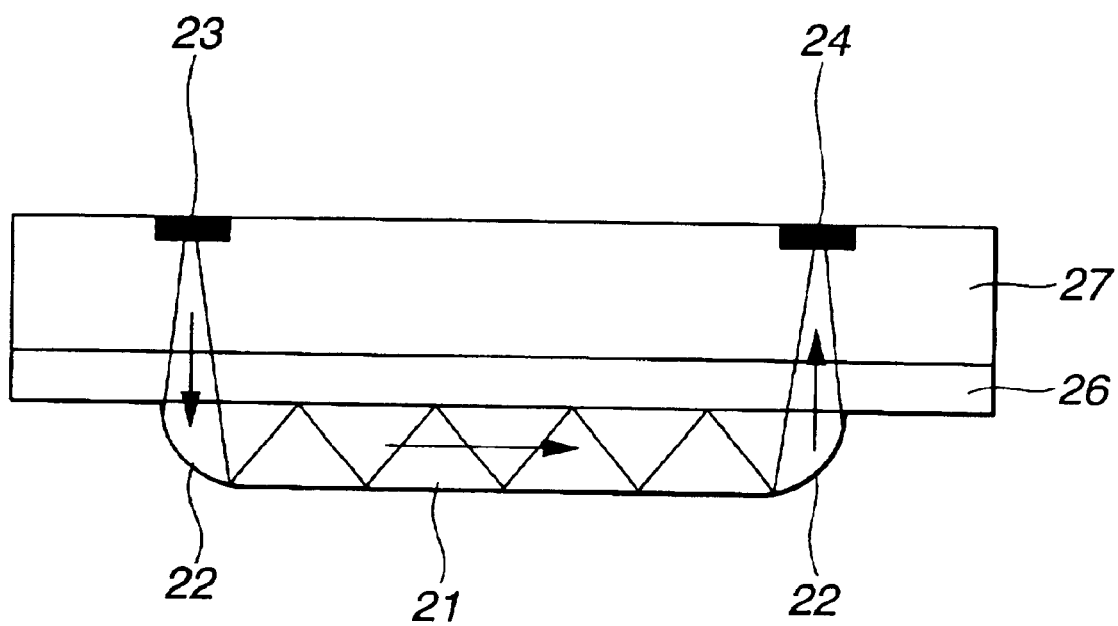
FIG. 3 is a cross-sectional view illustrating another optical interconnection device using a waveguide of the present invention.

FIGS. 2 and 3 respectively illustrate typical simple optical interconnection devices in which a waveguide 21 with end portions 22 formed on a cladded plate 26 is provided on a substrate 25 or 27. In the structure of FIG. 2, a light emitting device 23 and a light receiving device 24 are formed on a surface of the substrate 25, and this surface of the substrate 25 is bonded to the cladded plate 26 with positions of the devices 23 and 24 aligned with the respective end portions 22 of the waveguide 21. In the structure of FIG. 3, a light emitting device 23 and a light receiving device 24 are formed on a surface of the substrate 27, and the other surface of the substrate 27 is bonded to the cladded plate 26 with positions of the devices 23 and 24 aligned with the respective end portions 22 of the waveguide 21.

The end portion 12 or 22 has an approximately spherical profile, so that this profile acts as a concave mirror. Thereby, light emitted from the light emitting device 23 perpendicularly to the cladded plate 26 can readily couple to the waveguide 11 or 21 through the end portion 12 or 22, and light converged by the end portion 12 or 22 can readily couple to the light receiving device 24.

A waveguide of the present invention can be fabricated by using, as a mold for forming a waveguide, a substrate with a partial cylindrical recess formed by a method of fabricating a partial cylindrical structure.

Figure 4A:
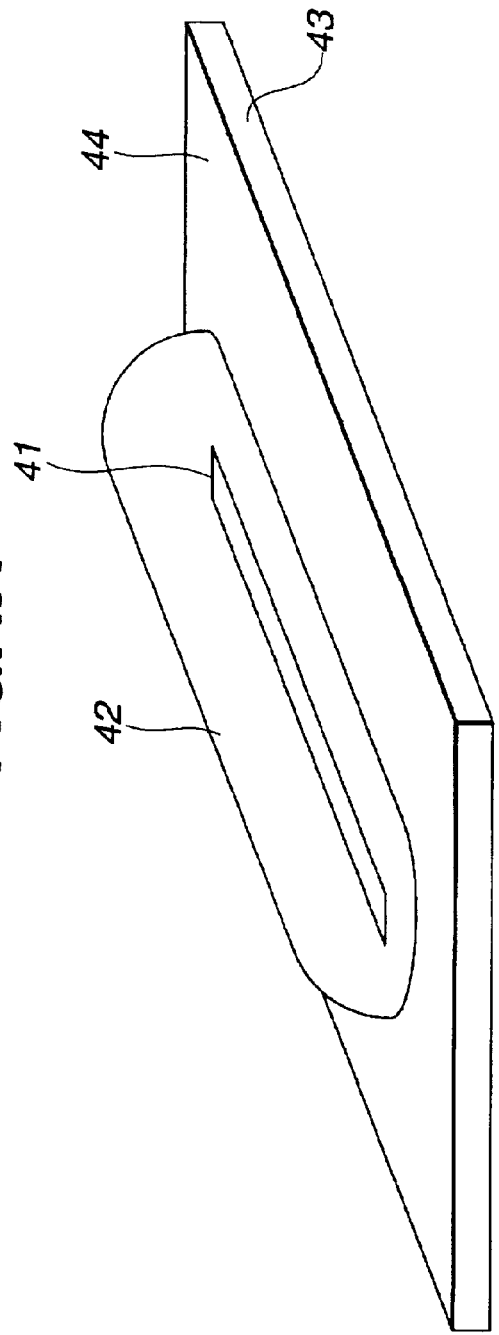
FIGS. 4A and 4B are views illustrating a partial cylindrical profile of a waveguide of the present invention fabricated by using electroplating.

As illustrated in FIG. 4A, a waveguide can be fabricated by using a partial cylindrical plated layer 42 grown on an elongated slit-shaped opening 41. Its fabrication process will now be described. The slit-shaped opening 41 is formed in an insulating mask layer 44 coated on a substrate 43 with a conductive portion, which acts as an electroplating electrode. The partial cylindrical plated layer 42 is formed on the opening 41 by electroplating. A mold material is coated on a master mold of the substrate 43 with the partial cylindrical plated layer 42. The mold for forming a waveguide is fabricated by removing the mold from the master mold.

Figure 4B:
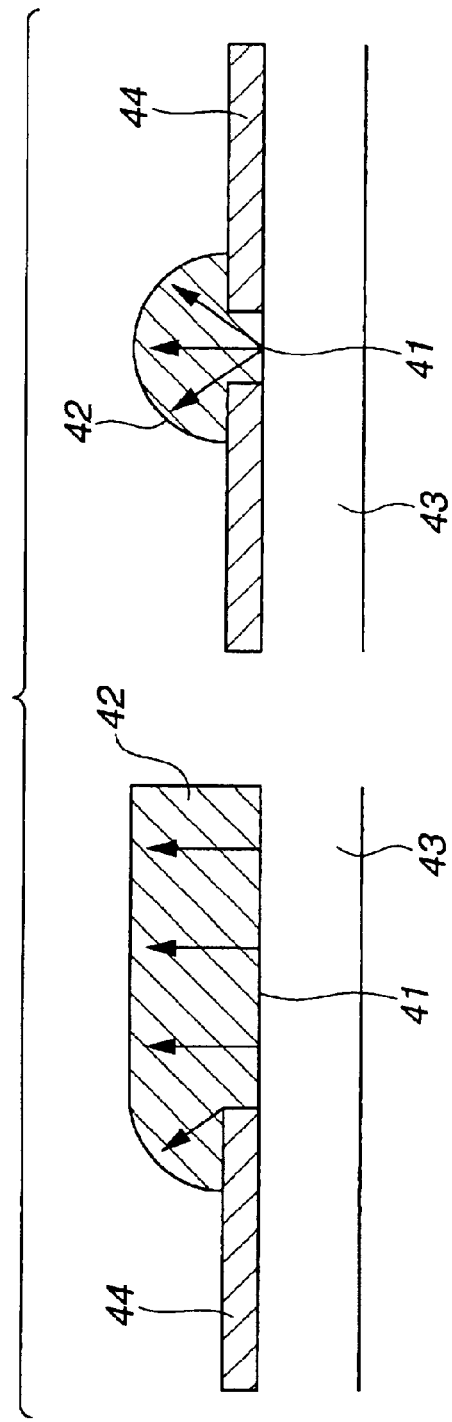

When the electroplating is conducted on the opening 41, a plated layer is initially formed in the opening 41, and the plated layer expands in the opening 41 and onto the mask layer 44 as the electroplating continues. The plated layer 42 is grown isotropically when the slit width of the opening 41 is much smaller than the size of an anodic electrode for electroplating in an electroplating bath. Therefore, as illustrated in FIG. 4B, the cross section of the plated layer 42 in a plane perpendicular to the extension of the opening 41 is semispherical, while that in a plane parallel with the extension of the opening 41 is rectangular, except at its end portion. As a result, the thus-grown plated layer 42 gains a partial cylindrical profile. Since the plated layer 42 is isotropically grown, the plated layer 42 at a slit end of the opening 41 is shaped into an approximately partial-spherical profile.

A more accurate partial cylindrical profile can be obtained when a relation of $\phi \leq 0.35R$ is met, where $\phi$ is the width of the opening 41 and R is the curvature radius of the plated layer 42 immediately above the opening 41. This relation is especially critical where the width of the opening 41 exceeds 10 $\mu$m. Where the width of the opening 41 is less than 10 $\mu$m, a more accurate partial cylindrical profile can be obtained without requiring any special condition. This fact is utilized when a much narrower waveguide is required.

As compared with a conventional method of forming an original substrate by etching, the above method is advantageous in fabrication controllability. An undesired profile error caused by over-etching, which proceeds until a washing step is conducted can be prevented in the above-described method. The deposition of the plated layer can be stopped when desired by terminating an electroplating current flowing between cathode and anode. The current flow is thus ended at the point when a desired profile is obtained. The radius of the partial cylindrical plated layer 42 can be controlled by the electroplating time, so a waveguide with a desired width can be obtained.

The profile of a waveguide fabricated by molding using the above mold is the same as that of the plated layer 42. A material, which is readily removable from the waveguide mold, is used as a material of the waveguide.

The mold for a waveguide can be directly formed from the master mold fabricated by the above-described electroplating. Therefore, expensive equipment is not needed, fabrication costs can be reduced, and the size of the mold can be readily enlarged. Furthermore, the size of the plated layer can be controlled in situ by controlling electroplating time and temperature. The master mold and hence the waveguide width can be thus controlled readily and precisely.

A more complex waveguide mold can be formed by a similar method in which a plurality of slit-like openings are formed in the mask layer corresponding to the arrangement of waveguides. As a removing method, the waveguide substrate may be mechanically removed from the mold. If the waveguide substrate is likely to be deformed because of its size, it is also possible to remove the substrate, mask layer, and plated layer sequentially from the bottom side by etching.

When a mold is formed after a sacrificial layer is formed on the substrate with the plated layer, the mold can be separated from the substrate by removing the sacrificial layer. In this case, a material of the sacrificial layer is selected such that the master mold is not corroded by an etchant for etching the sacrificial layer. Here, when neither the plated layer nor the substrate can be corroded by that etchant, the substrate with the plated layer can be used as a master mold many times. A second mold needs to be fabricated by the same method only when the original mold is contaminated or damaged after a plurality of uses thereof.

As a material of the waveguide mold, any material, such as resin, metal, and insulating substance, can be used so long as the material can be deposited on the substrate with the plated layer and separated therefrom. As a simple method of fabricating the mold, there is a method in which resin, metal, fused glass, or glass-dissolved solution is coated on the substrate with the plated layer and hardened, and thereafter the material is separated by the above separating method. In this case, a metal material is selected, which will neither thermally damage nor alloy the substrate and the plated layer.

In another method, a mold is electroplated on the plated layer and the mask layer with the substrate as a cathode. Where the sacrificial layer is used, an electrode layer for forming the mold is formed on the sacrificial layer, and the electroplating is conducted with this electrode layer used as a cathode. A waveguide with a desired profile can thus be readily fabricated using such a mold at a low cost.

Further, a waveguide can be formed on any substrate or sheet since the waveguide is fabricated by molding. The waveguide can be formed on a semiconductor wafer, so the waveguide can be suitably integrated with a variety of optical and/or electronic devices. The waveguide can be thus applied widely to an optical interconnection device wherein light is used for transfer of signal or data.

A method of fabricating a first embodiment of the waveguide of the present invention will be described in more detail by reference to FIGS. 5A through 5E, 6A through 6E and 7.

Figure 5A:
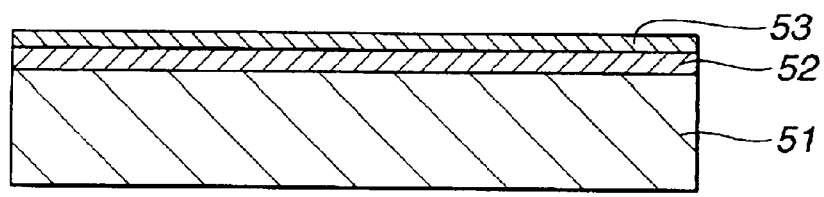
FIGS. 5A to 5E are cross-sectional views illustrating a method of fabricating a waveguide of the present invention.

A substrate used in FIG. 5A will be initially described. An electrode layer 52 is formed on a substrate 51 for forming a plated layer, and a mask layer 53 is then formed on the electrode layer 52. Any material, such as metal, semiconductor (a silicon wafer, or the like), and insulating substance (such as glass, quartz, polymer film or the like), can be used as the substrate material. When metal is used as the substrate, there is no need to form the electrode layer 52. Further, when a semiconductor material is used, the electrode layer 52 is not necessarily needed if the semiconductor has enough conductivity to enable electroplating. However, where a metal or semiconductor material is used as the substrate, a plated layer will also be formed on a portion other than the mold forming portion, since the entire substrate is immersed in an electroplating liquid. Therefore, when the plated layer is desired to be formed on a predetermined portion only, an insulating substance can be preferably used as the substrate. Alternatively, a metal or semiconductor material, whose surface is partially insulated, may also be used.

A material of the electrode layer 52 is selected from materials which are not corrosive to an electroplating liquid used since the electrode layer is exposed to the electroplating liquid. The mask layer 53 may be formed of any inorganic or organic insulating material that is also anticorrosive to the electroplating liquid.

Since the substrate 51 is used as the master mold, the substrate is preferably composed of a substrate with little waviness and low surface roughness. As the substrate, a metal plate, a glass substrate, a silicon wafer or the like with an excellent flatness and a large Young's modulus can preferably be used because the substrate undergoes a possibility of warping due to inner stress or thermal stress of the plated layer.

When a thick electrode layer or a thick mask layer is formed on the substrate 51, its surface roughness may increase depending on the particular forming method. Accordingly, a thin-film forming method, such as a vacuum-evaporation method, a spin-coat method, and a dip method is used as a method for forming the electrode layer 52 and the mask layer 53.

Figure 5B:
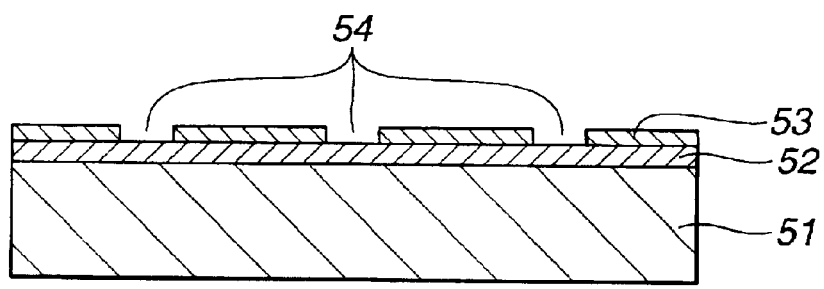

As illustrated in FIG. 5B, slit-like openings 54 are then formed in the mask layer 53. A plated layer 55 is formed through the opening 54, and extends onto the mask layer 53 as the electroplating proceeds. When the opening width is narrowed, a waveguide with a smaller radius can be formed. The opening 54 is formed in the mask layer 53 by semiconductor photolithography and etching that can form a minute opening. When the mask layer 53 is formed using a photoresist, an etching process can be omitted.

Figure 5C:
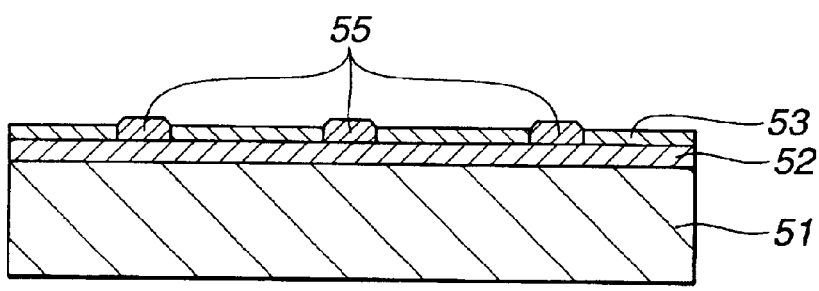
Figure 7:
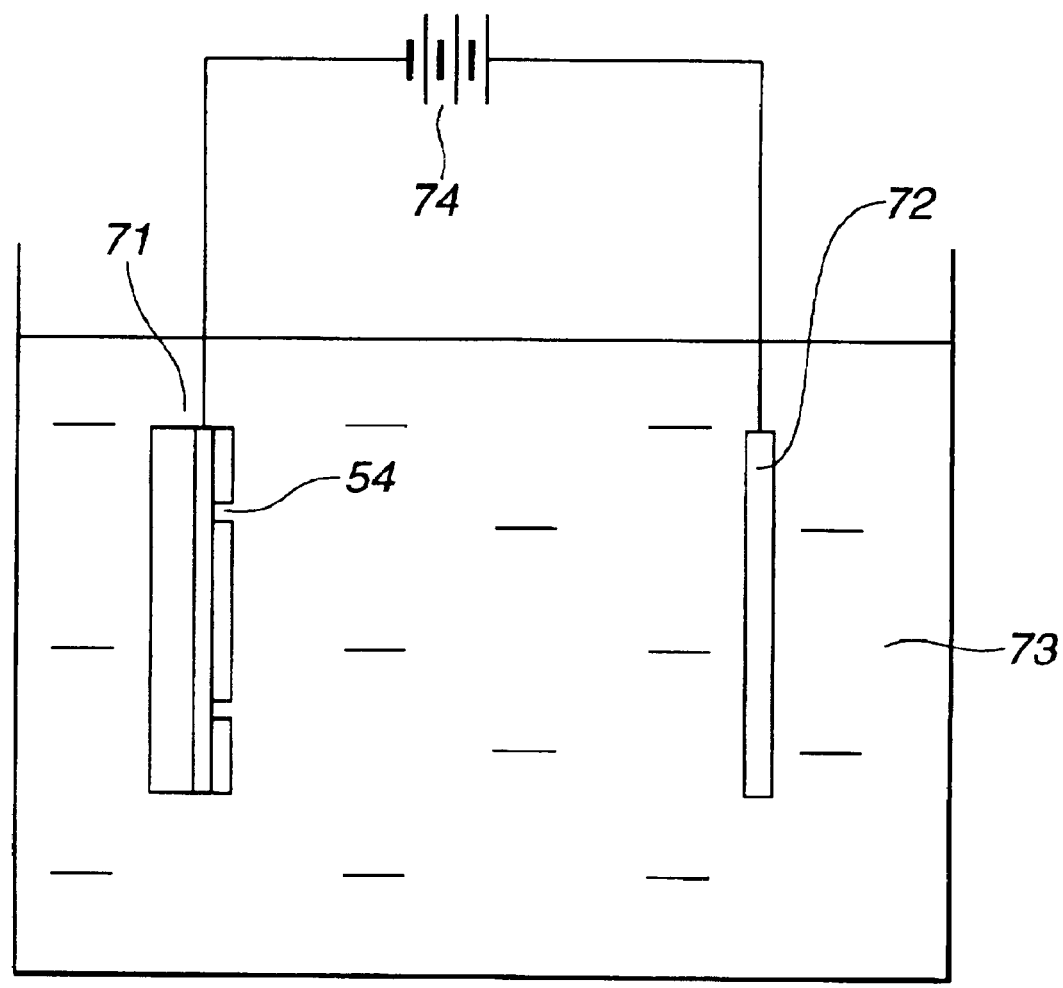
FIG. 7 is a view illustrating an electroplating bath used in a method of fabricating a waveguide of the present invention.

As illustrated in FIG. 7, the substrate with the opening 54 acting as a base 71 for electroplating is immersed in an electroplating bath 73 containing metal ions of an electroplating apparatus. The base 71 and an anodic plate 72 are connected to an external power source 74 to cause a current flow through the bath 73 and form the plated layer 55 in the opening 54. The plated layer 55 is initially formed in the opening 54 as illustrated in FIG. 5C. Herein, no flow of the electroplating liquid 73 is caused to occur near the opening 54 during the electroplating process. If the electroplating liquid 73 flows near the opening 54 when the plated layer 55 is grown in the minute opening 54, an electroplating growth rate on a downstream side of the flow will be larger than that on an upstream side of the flow, and hence, the plated layer 55 will grow asymmetrically with respect to a central line of the opening 54. The structure including such an asymmetrical plated layer cannot be used as the master mold.

As a method of preventing the flow in the electroplating liquid 73, there is a method of not performing stirring of the electroplating liquid 73 during electroplating. In another method, a mesh is placed near the substrate to allow diffusion of the electroplating liquid 73, but prevents the flow thereof. In particular, the nonstirring method is simple and convenient. This nonstirring method is used in this embodiment.

When the electroplating is conducted, there is a possibility that the substrate will warp due to an inner stress or a thermal stress of the plated layer, which may be caused when the temperature of the electroplating bath is raised for the electroplating step. There is a difference over four orders of magnitude between Young's moduli or yield stresses between resin and metal or inorganic material. Accordingly, when the mask layer 53 of resin is formed with approximately the same thickness as the conductive layer or the plated layer, the master mold is quite likely to warp. Further, when the mask layer 53 of resin is used, there is the problem that the resin will swell due to the electroplating liquid, in addition to the problem of stress. Therefore, where the mask layer 53 of resin is used, it is preferable to form a thin mask layer, compared with the thickness of the conductive substance or the substrate 51 with the electrode layer 52.

Figure 5D:
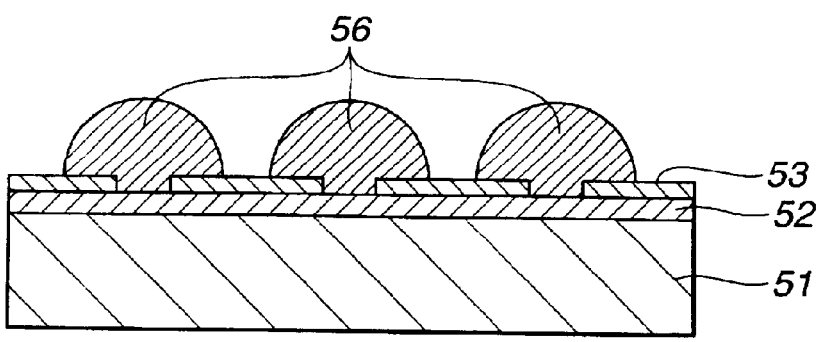

As illustrated in FIG. 5C, the plated layer 55 is formed in the opening 54 by deposition of metal ions in the electroplating bath 73 caused by the electrochemical reaction. As the electroplating proceeds, a plated layer 56 extends onto the mask layer 53 as illustrated in FIG. 5D.

When the electroplating is effected at the minute opening 54 in the electroplating liquid 73 containing metal ions, metal ions in the liquid 73 move toward the plated layer, and hence, deposition of the electroplating proceeds with its growth direction being isotropic. Thus, a semicylindrical structure 56 is formed. The isotropic electroplating growth is also due to the facts that the opening 54 is much smaller than the anodic plate 72 and that metal ions are uniformly dissolved in the electroplating liquid 73.

Here, the width of a waveguide to be fabricated is in a range from 2 or 3 $\mu$m to 20 or 30 $\mu$m. Therefore, the width of the slit-like opening 54 must be smaller than the width of such a waveguide. The thickness of the plated layer 56 can be readily controlled by controlling the electroplating time and temperature.

The following materials can be used as an electroplating metal: as a single metal, Ni, Au, Pt, Cr, Cu, Ag, Zn, and the like can be employed; as an alloy, Cu—Zn, Sn—Co, Ni—Fe, Zn—Ni, and the like can be used. Any material can be used so long as electroplating is possible. Ni, Cr, and Cu are especially preferable as the electroplating material for the master mold because these metals permit bright electroplating to be readily achieved.

Further, when forming the partial cylindrical structure by electroplating, dispersion electroplating, in which dispersion particles, such as $Al_2O_3$, $TiO_2$ and PTFE, are added to the electroplating bath, can also be used. Mechanical strength and corrosion resistivity of the master mold can be improved by the dispersion particles.

A mold for forming a waveguide is formed on the thus-fabricated substrate with the partial cylindrical plated layer 56. As a method for forming the waveguide mold, there is a method in which fused or dissolved liquid of mold material is coated on the substrate 51, and cured. Here, materials of the mold material and the plated layer 56 are so selected that the cured mold material can be readily separated from the plated layer 56. The mold for forming a waveguide is thus fabricated.

In another method for forming the mold, another electroplating liquid is prepared, an electroplating material is deposited on the partial cylindrical structure 56 illustrated in FIG. 5D, and the electroplating is continued until a continuous layer of the mold is formed on the substrate. Also in this method, materials of the mold material and the plated layer 56 are so selected that the cured mold material can be readily separated from the plated layer 56. Alternatively, the substrate 51, mask layer 53, and plated layer 56 are etched by respective etchants to only leave the waveguide mold. In this case, a material having an etching resistivity to the etchant is selected as the mold material.

Figure 5E:
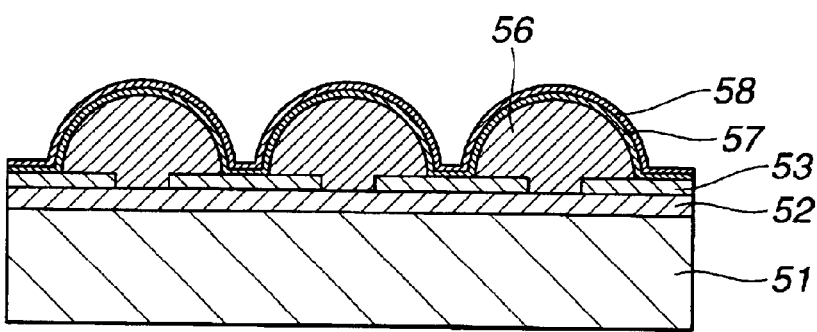
Figure 6A:
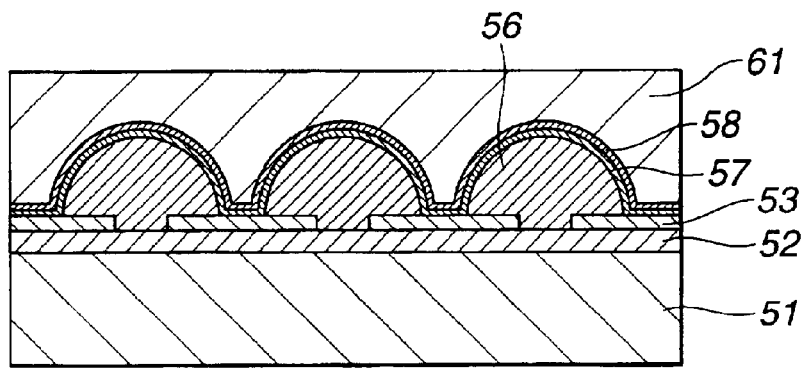
FIGS. 6A to 6E are cross-sectional views illustrating a method of fabricating the waveguide of the present invention.
Figure 6B:
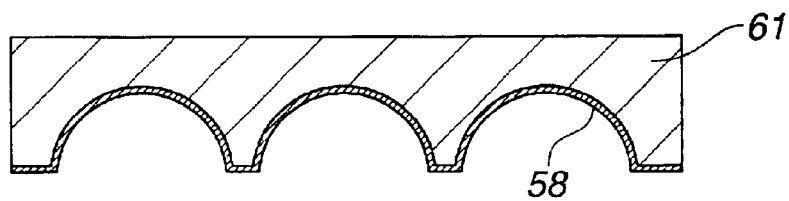

As another separating method, there is a method in which a sacrificial layer 57 is introduced and a waveguide mold is formed by electroplating. In this method, the sacrificial layer 57 is formed on the substrate as illustrated in FIG. 5E, an electrode layer 58 for electroplating a mold thereon is then formed, and electroplating is carried out in an electroplating liquid containing metal ions with the electrode layer 58 as a cathode as illustrated in FIG. 6A. Thereafter, the sacrificial layer 57 is etched away to separate a mold 61 with the electrode layer 58 from the substrate 51 with the plated layer 56, as illustrated in FIG. 6B. The mold 61 is fabricated by etching the electrode layer 58, as illustrated in FIG. 6C.

Figure 6C:
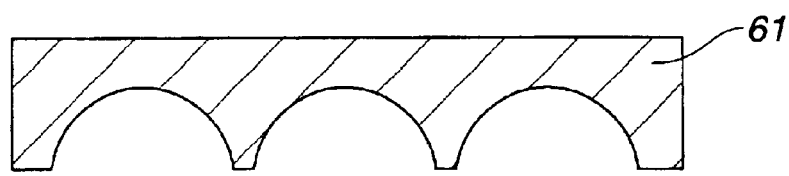

Although the electrode layer 58 for forming the mold 61 is removed in the fabrication method illustrated in FIGS. 6A to 6C, the electrode layer 58 need not be removed where there is no problem that the waveguide surface is contaminated by the electrode layer 58 or the electrode layer 58 has a small yield stress and is hence liable to be damaged during a molding process of forming the waveguide.

Further, though the sacrificial layer 57 is formed on the plated layer 56 and the mask layer 53 in the fabrication method illustrated in FIGS. 6A to 6C, the sacrificial layer 57 may not be formed and instead the electrode layer 58 can be used as a sacrificial layer as well. In this method, during a process of removing the sacrificial layer from FIG. 6A to FIG. 6B, the electrode layer 58 is removed by etching to obtain the mold 61 as illustrated in FIG. 6C.

The mold for forming a waveguide of this embodiment can be thus fabricated by the above fabrication methods.

Figure 6D:
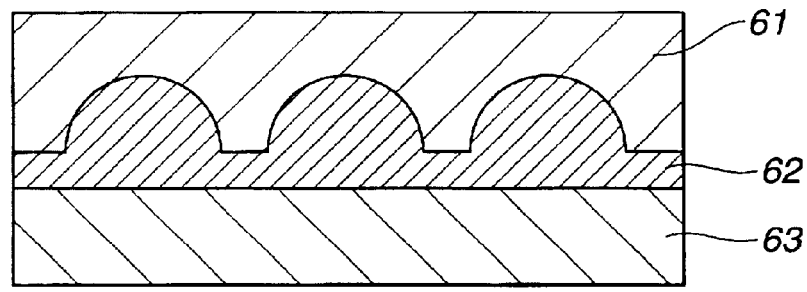
Figure 6E:
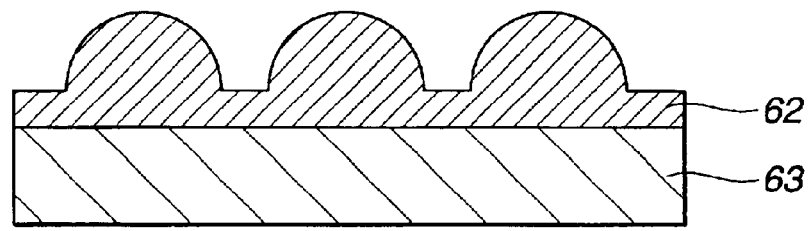

Another method of fabricating a waveguide will now be described. Here, the waveguide is formed of resin. As illustrated in FIG. 6D, a resin 62 is coated on the waveguide mold 61 obtained by the above process, a support substrate 63 is then laminated on the resin 62 to obtain a uniformly-flat surface of the resin 62, and the resin 62 is cured by a curing method suitable for the resin used. Thermosetting resin, ultraviolet-ray curable resin, or electron-beam curable resin is hardened by heat, ultraviolet rays, or electron beam radiation. In the case of ultraviolet rays, light is radiated from the bottom side of the waveguide 62. Therefore, when the support substrate 63 is used, a light-transmitting support substrate is selected as the support substrate 63.

At the time of hardening, bubbles should not be generated in the resin 62. When the resin 62 is coated, it is preferable to take gas out from the resin 62. After hardening, the resin 62 is separated from the mold 61 to form the waveguide. The hardened partial cylindrical resin 62 constitutes a core of the waveguide. As a cladding layer, the support substrate 63 can be used, or a sufficiently-thick cladding layer may be beforehand deposited on the support substrate and a core may be formed by molding of resin. The refractive index of the cladding layer is set lower than that of the core. The waveguide without the support substrate may also be used.

The resin 62 of the waveguide must be a material which transmits light in a wavelength range utilized by a light emitting or receiving device used together with the waveguide. In the above method of fabricating the waveguide, limitations of materials of the waveguide 62 and the support substrate 63 can be decreased, in contrast with a conventional method. When fused glass is used in place of resin, a waveguide of glass can be fabricated.

(Second Embodiment)

Figure 8:
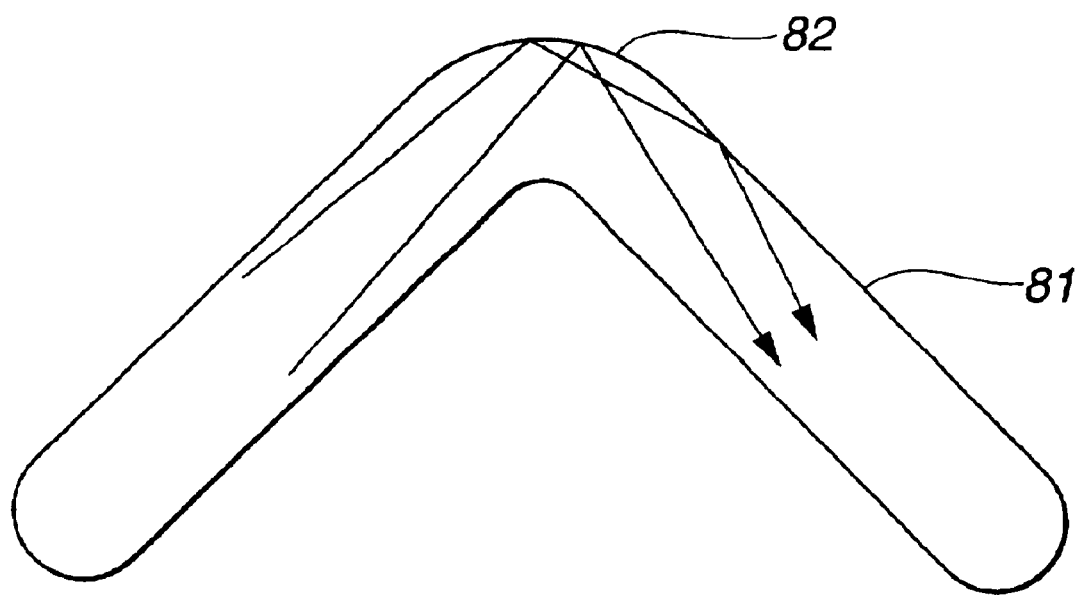
FIG. 8 is a view illustrating another configuration of an optical waveguide of the present invention.

According to a method of fabricating an optical waveguide according to a second embodiment of the present invention, a waveguide with a desired pattern can be readily fabricated. For example, when a slit-like opening for forming a waveguide master mold is formed in an L-shaped pattern, an L-shaped waveguide 81 can be fabricated as illustrated in FIG. 8. Light propagating along the waveguide 81 can be curved as illustrated in FIG. 8. Owing to the isotropic electroplating growth, a curved portion 82 of the waveguide 81 can have an approximately partial spherical profile. This curved portion 82 establishes a total-reflection corner. As a result, propagating light is curved without optical loss due to scattering and transmission at the curved portion 82.

(Third Embodiment)

Figure 9:
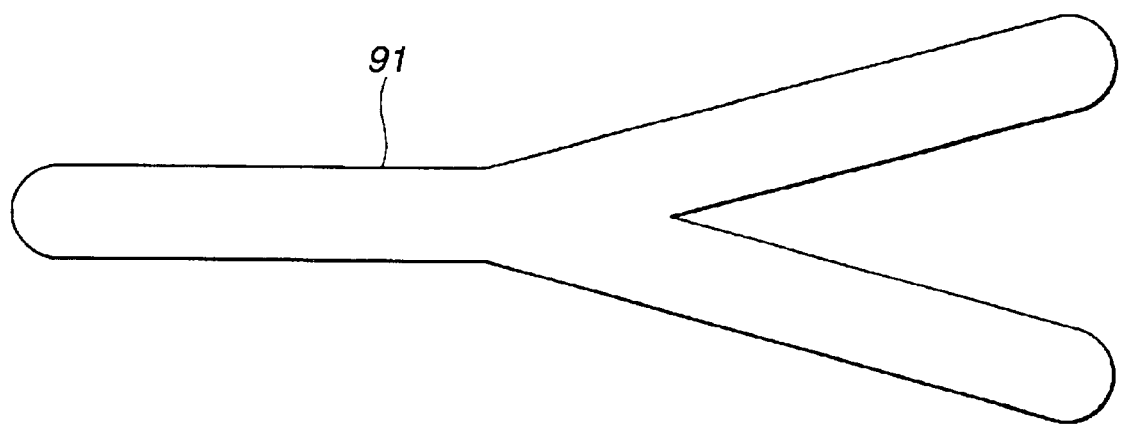
FIG. 9 is a view illustrating yet another configuration of an optical waveguide of the present invention.

Similarly, when a slit-like opening for forming a waveguide master mold is formed in a Y-shaped pattern, a Y-shaped branching/combining waveguide 91 can be fabricated as illustrated in FIG. 9. Similarly to the waveguide of FIG. 8, its curved portion is smoothly contoured, and hence, scattering loss of propagating light due to light branching/combining can be greatly reduced.

(Fourth Embodiment)

Figure 10:
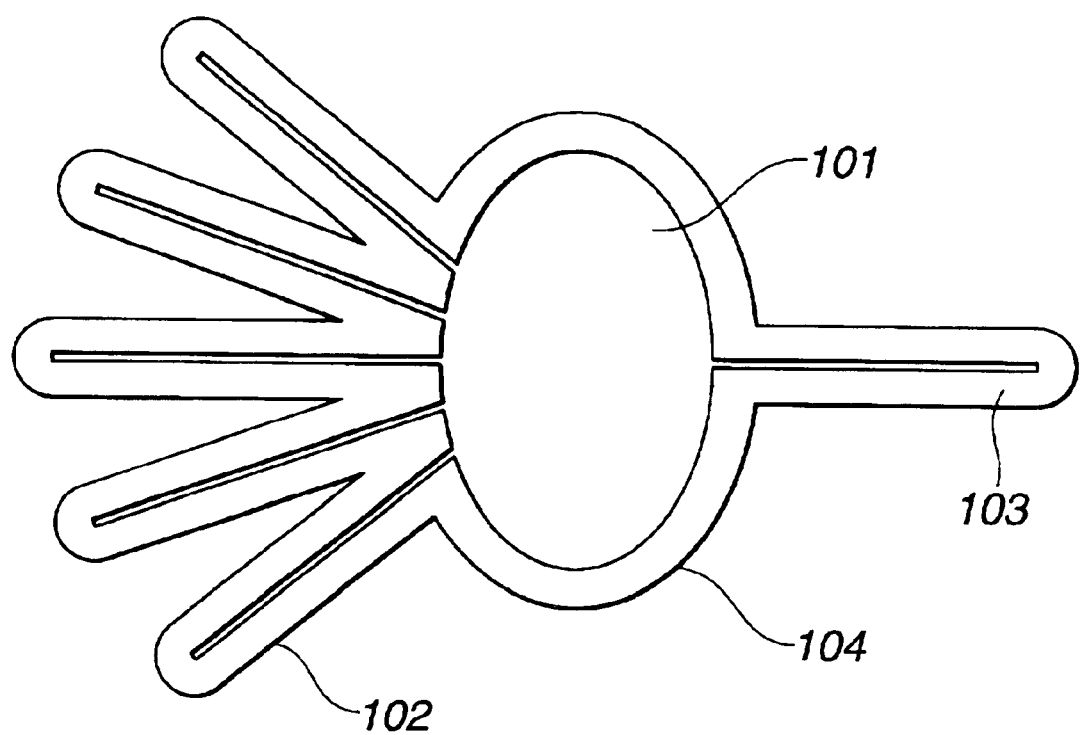
FIG. 10 is a view illustrating yet another configuration of an optical waveguide of the present invention.

FIG. 10 illustrates a master mold for forming a multi-input optical combining waveguide. A pattern 101 of an opening for forming a plated layer has a narrow multi-slit portion for forming a master mold portion 102 for a precombining waveguide portion, a narrow single-slit portion for forming a master mold portion 103 for a postcombining waveguide portion, and an expanded portion for forming an expanded master mold portion 104 for a slab waveguide portion.

(Fifth Embodiment)

Figure 11:
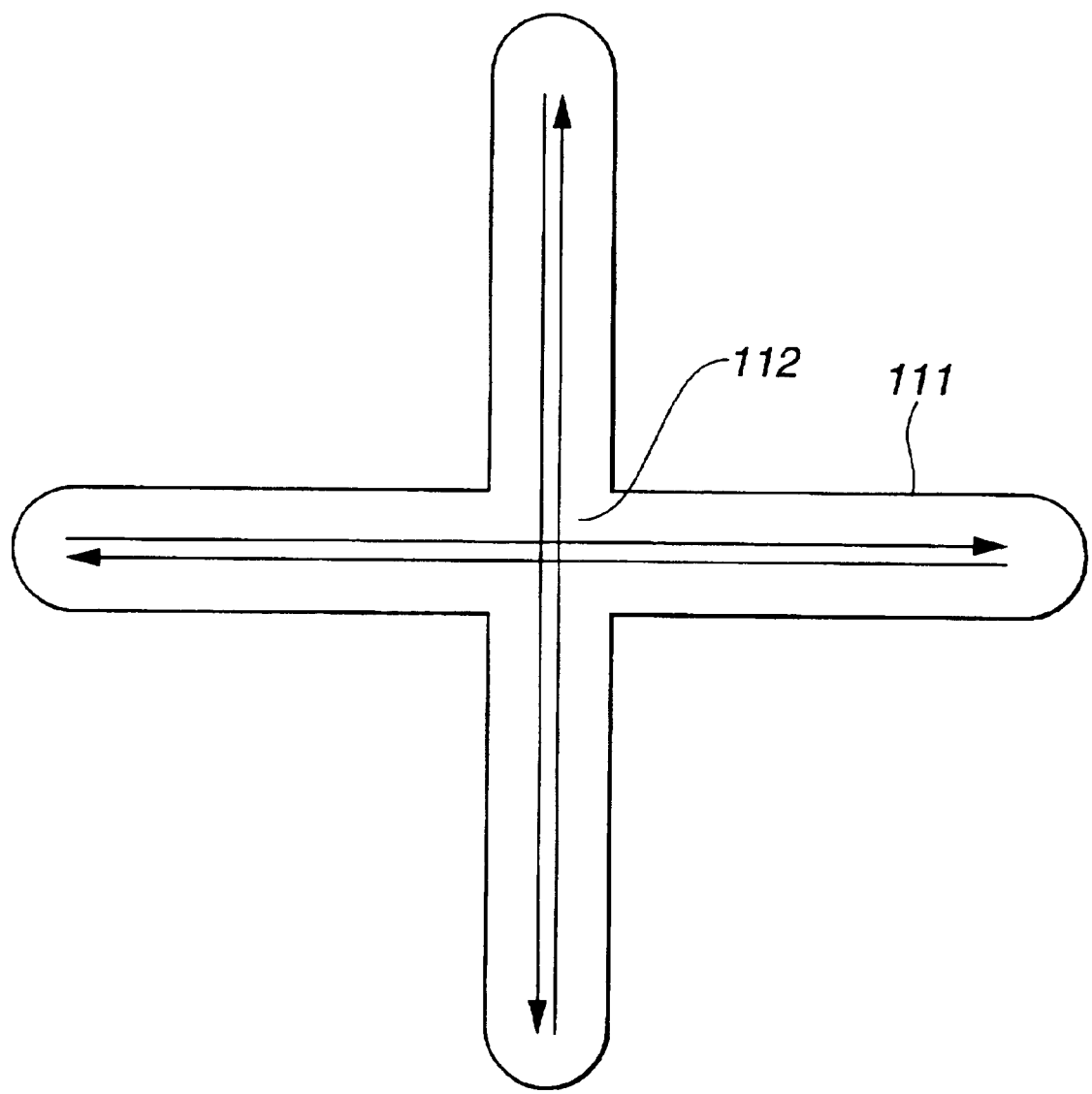
FIG. 11 is a view illustrating yet another configuration of an optical waveguide of the present invention.

FIG. 11 illustrates a crisscross waveguide 111. In the waveguide 111 with a crossing portion 112 at right angles, which has a sufficiently-smooth curved surface, propagating light slightly expands at the crossing portion 112, but a total-reflection condition for light to propagate toward another waveguide extending at right angles is not met. Therefore, light propagates straight through with little coupling to another waveguide extending at right angles. Thus, though a little insertion loss at the crossing portion 112 exists, light travels straight through irrespective of the presence of the crossing portion 112. Such an orthogonal characteristic of propagating signals cannot be achieved using an electric wiring.

As described in the foregoing, a waveguide of the present invention can have a desired pattern, and be fabricated by molding of a waveguide material. The waveguide can be hence applied to various uses, such as optical communication, optical interconnection, measurement, and recording.

(Sixth Embodiment)

A fabrication method of a waveguide used in a sixth embodiment will be described by reference again to FIGS. 5A through 5E and 6A through 6E.

A silicon wafer having a diameter of six inches is thermally oxidized using an oxidizing gas, and layers of silicon dioxide with a thickness of 1 $\mu$m are formed on opposite surfaces of the wafer. This wafer is used as a substrate 51 illustrated in FIGS. 5A to 5E. Cr and Au are continuously layered with thicknesses of 10 nm and 200 nm on the above-described wafer, respectively, using an electron-beam evaporation method, which is one of thin-film forming methods. An electrode layer 52 is thus formed.

Aromatic polyamide acid solution is then spin-coated, and this coating is thermally treated to form a mask layer 53 of polyimide. Further, coating, exposure, and development of the photoresist are performed using photolithography to form an opening in the resist. The mask layer 53 at the resist opening is etched by reactive ion etching using oxygen. Thus, the electrode layer 52 is exposed, and an opening 54 is formed. The photoresist is removed thereafter.

Herein, the opening 54 has a slit shape with a width of about 2 $\mu$m. Electroplating is then performed using the above-described wafer as a base 71, as illustrated in FIG. 7. The electrode layer 52 is used as a cathode, and a Ni electroplating bath 73 containing nickel (II) sulfate, nickel (II) chloride, boric acid and brightener is used. Ni electroplating is thus performed at the bath temperature of 50° C. and the cathode current density of 5 A/dm$^2$. A Ni plated layer 55 is initially deposited in the opening 54 and grows therein. The plated layer 55 expands onto the mask layer 53, and a semicylindrical plated layer 56 is thus formed as illustrated in FIG. 5D. The plated layer 56 is deposited until its width reaches 10 $\mu$m. Here, an anodic plate 72 with a square of about 2 or 3 cm×2 or 3 cm is sufficiently large relative to the opening 54 having a width of 2 $\mu$m, so the isotropic electroplating can be attained.

Phosphosilicate glass (PSG) with a thickness of 1 $\mu$m is then deposited at 350° C. by an atmospheric pressure chemical vapor deposition (CVD) to form a sacrificial layer 57 as illustrated in FIG. 5E. Ti and Au are continuously layered with thicknesses of 10 nm and 200 nm on the above-described wafer, respectively, using an electron-beam evaporation method. An electrode layer 58 for forming a master mold is thus formed as illustrated in FIG. 5E.

The electrode layer 58 is then used as a cathode, and the above Ni electroplating bath is again used. Ni electroplating is thus performed at the bath temperature of 50° C. and the cathode current density of of 5 A/dm$^2$. A mold 61 is thus formed as illustrated in FIG. 6A.

The wafer of FIG. 6A is then immersed in a mixture solution of hydrofluoric acid and ammonium fluoride to etch and remove the sacrificial layer 57 of PSG. The substrate 51 and the mold 61 can be separated as illustrated in FIG. 6B. The Ti of the electrode layer 58 can be removed simultaneously. After that, the Au of the electrode layer 58 is etched by a mixture solution of iodine and potassium iodide. The mold 61 for forming a waveguide can be thus produced as illustrated in FIG. 6C.

The separated substrate has the semicylindrical structure 56 as illustrated in FIG. 5D. Therefore, the mold 61 for a waveguide can be repeatedly produced by performing the steps of FIGS. 5E and 6A through 6C using that separated substrate.

In the fabrication method of a waveguide mold of this embodiment, the mold 61 can be fabricated by electroplating. Accordingly, a plurality of molds 61 with the same profile can be produced. Thus, a plurality of molds can be fabricated in this embodiment by repeatedly using the master mold and the sacrificial-layer forming process, in contrast with the prior art mold fabricating method in which a single original mold is used. Hence, fabrication costs can be further reduced in this embodiment.

A resin 62 of ultraviolet-ray curable photopolymer is then deposited on the concave mold 61. After a support substrate 63 of glass is placed on the resin 62, the resin 62 is hardened by exposing the resin 62 to ultraviolet rays. The refractive index of the photopolymer 62 is larger than that of the glass substrate 63, and the photopolymer 62 can hence act as a waveguide core. Further, a metal layer is laid down over a portion of the glass substrate 63 to implement a light emitting or receiving device (later described) and an IC chip thereon. Any transparent material with a sufficient strength can be used as the substrate 63 in this embodiment, in place of glass.

A method of fabricating the light emitting or receiving device, which is combined with the above waveguide, will be described. Here, a surface emitting laser of a 0.8 $\mu$m-band is used as the light emitting device, and a pin photodiode is used as the light receiving device.

Figure 12:
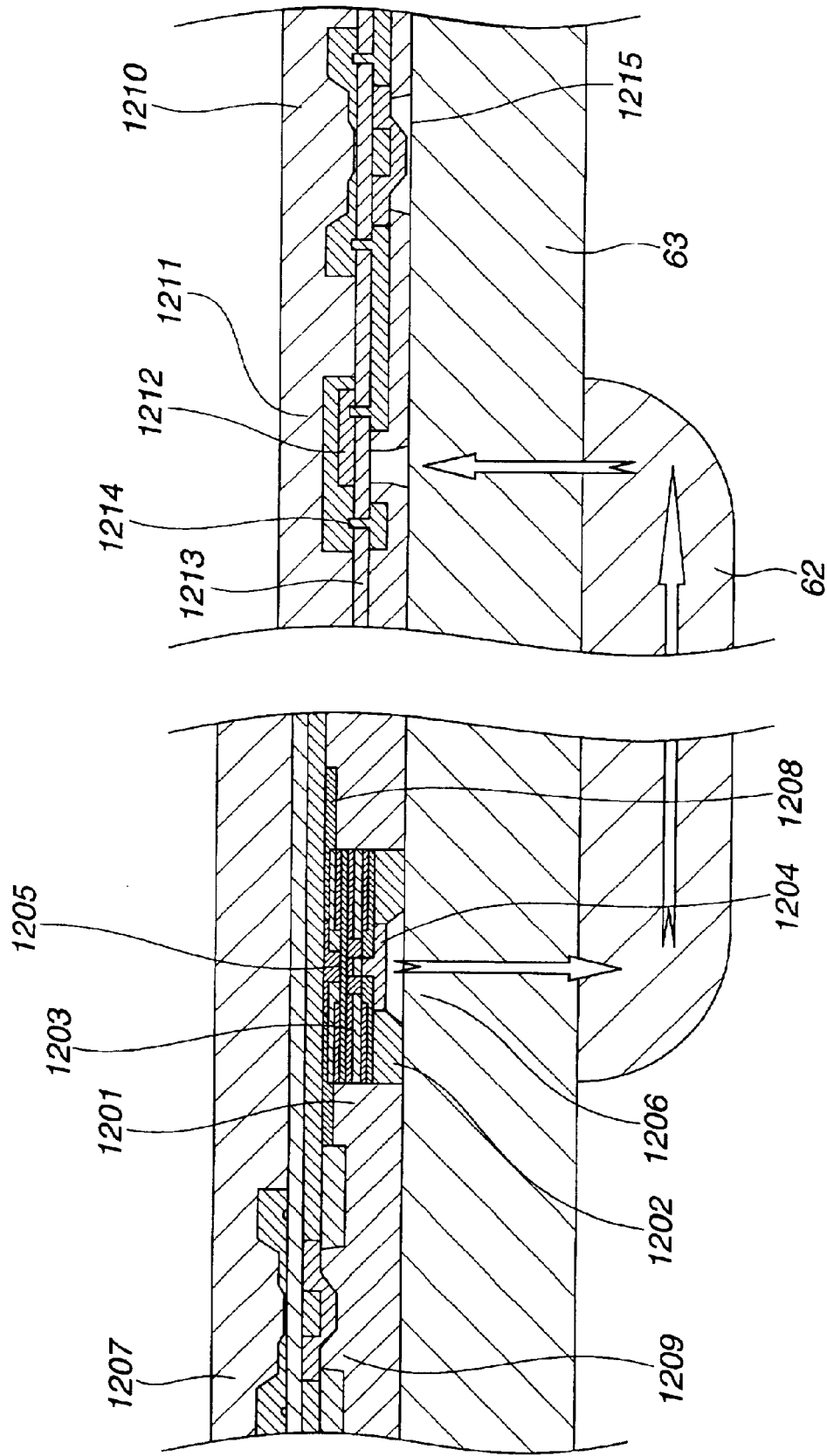
FIG. 12 is a partly-cut-away cross-sectional view illustrating another optical interconnection device using a waveguide of the present invention, which is integrated with a light emitting device and a light receiving device.

As illustrated in FIG. 12, a surface emitting laser chip 1201 has a construction in which a structure sandwiching a one-wavelength cavity with an AlGaAs/GaAs quantum well active layer 1203 and an AlGaAs spacer layer between distributed Bragg reflector (DBR) mirrors 1204 and 1205 of a-quarter-wavelength AlAs/AlGaAs layers (20 to 30 pairs) is epitaxially grown on a GaAs substrate 1202 using a metal organic vapor phase epitaxy (MOVPE) or the like. An annual recess extending down to the active layer 1203 is then formed by etching to form a current constricting structure for restricting a current flow into a light radiating region. The recess is filled with polyimide, and the polyimide is flattened. After an insulating layer of $SiN_x$ or the like is formed and a window is opened therein, an electrode is formed.

In this embodiment, a diameter of the light radiating region of the laser 1201 is 10 μm, and the entire laser chip size is a square of 2 mm×2 mm. Naturally, the laser chip size is not limited thereto. In this embodiment, the AlGaAs/GaAs active layer 1203 with a bandgap wavelength of 0.83 μm is epitaxially grown on the GaAs substrate, and hence, light will be absorbed by the GaAs substrate 1202. Therefore, the GaAs substrate 1202 is etched until the DBR mirror 1204 is exposed, and a window region 1206 is thus formed. In such a structure, light is emitted from the side of the substrate 1202.

On a Si substrate 1207 for implementation of the laser chip 1201, an electrode pad (electric wiring) 1208 is formed at a position corresponding to the surface emitting laser 1201. A transistor 1209 for driving the laser 1201 is also integrated on the Si substrate 1207. The wiring 1208 on the Si substrate 1207 is formed of a plated layer of Cu/Ni/Au. A solder layer is formed on the electrode pad 1208 by plating or the like. When the electrode of the laser chip 1201 and the electrode pad 1208 on the Si substrate 1207 are aligned to each other and heated, an electric connection therebetween can be readily obtained.

Other than the electric connection using the solder, there are a method of pressing Au electrodes against each other, and a method of applying ultrasonic waves to the connecting portion. Further, there is a method of coating, pressing, and heating an anisotropically-conductive adhesive agent containing conductive particles. In this case, when an Au wiring is plated with a thickness of over 10 μm, the anisotropy of the adhesive can be utilized. The electrodes can be thus bonded to each other with a good yield whith adjacent electric wires being insulated from each other.

Further, as illustrated in FIG. 12, a pin photodiode 1211 is formed on a p⁻(π)-Si substrate 1210 on a receiver side. FIG. 12 illustrates the structure of the photodiode 1211. An n-region 1212 of a light receiving portion is formed on the substrate 1210 by diffusion. An insulating layer 1213 of $SiO_2$ or the like is then formed, and an annular electrode 1214 and related wiring are formed. An electric contact with the n-region 1212 is achieved by forming a through-hole in the insulating layer 1213 and filling the through-hole with a material of the electrode 1214. On a p-side, a p⁺-layer is formed on the bottom surface of the substrate 1210, and an electrode is formed over the entire surface. A transistor 1215 for amplifying a signal is also integrated on the same substrate 1210.

In this embodiment, the thus-fabricated substrates 1207 and 1210 on transmitter and receiver sides are implemented on a metal layer formed on the glass substrate 63 with the waveguide 62.

Figure 13:
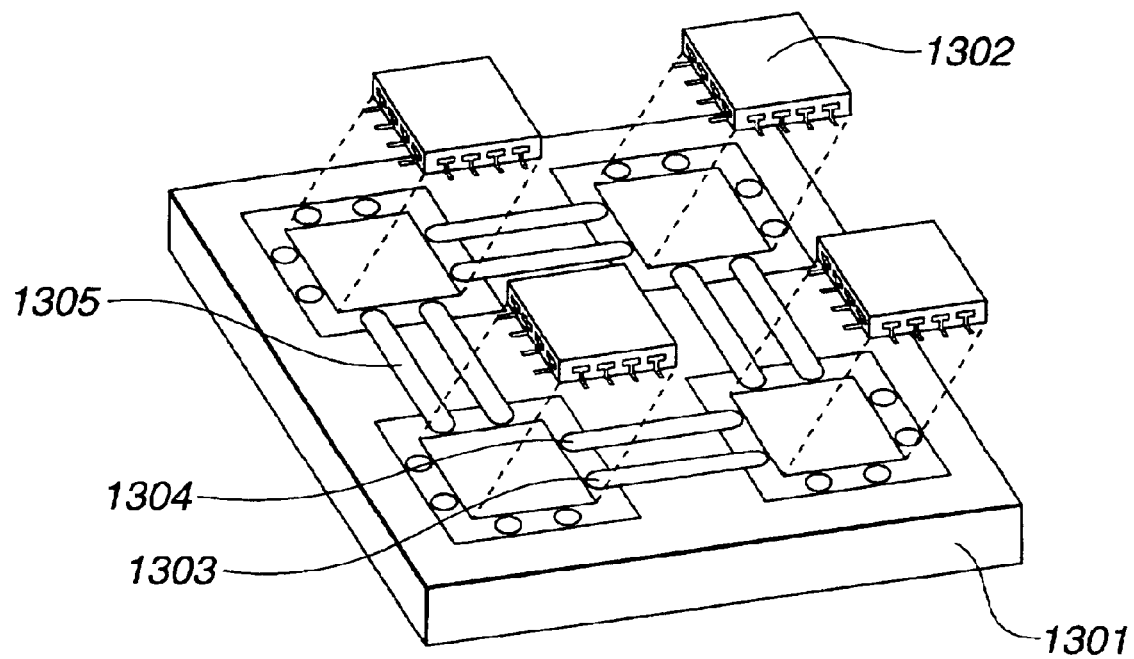
FIG. 13 is a perspective view illustrating an optical wiring between LSI chips constructed by a waveguide of the present invention.
Figure 14:
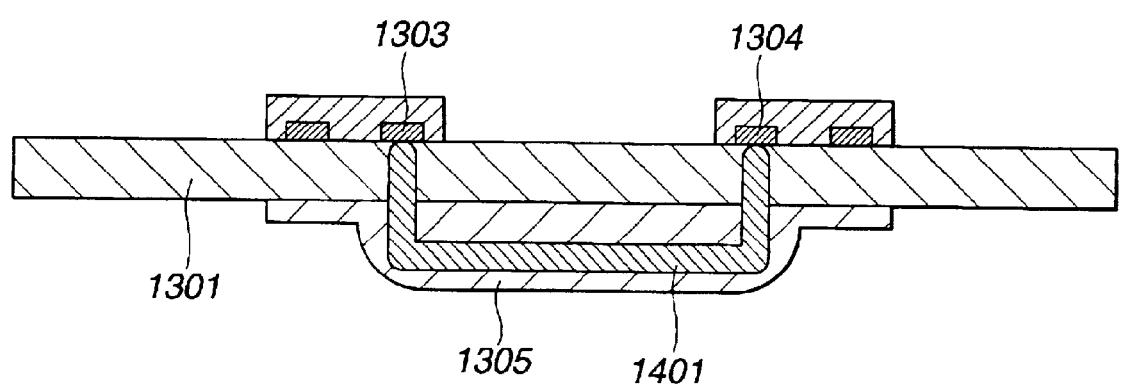
FIG. 14 is a cross-sectional view illustrating the optical wiring between LSI chips constructed by the waveguide of the present invention.

FIGS. 13 and 14 illustrate an optical interconnection device 1301 including waveguide and light emitting and receiving devices of this embodiment. In the optical interconnection device 1301, a surface emitting laser 1303 and a photodiode 1304 for optically performing input/output to or from an LSI chip 1302, respectively, are formed on respective substrates, and these substrates are implemented corresponding to the arrangement of the LSI chip 1302. Corresponding to positions of the surface emitting laser 1303 and the photodiode 1304, a plurality of waveguides 1305 are affixed to a bottom surface of the optical interconnection device 1301.

FIG. 14 illustrates a cross section of the interconnection device 1301. Light emitted from the surface emitting laser 1303 is transmitted to the photodiode 1304 through a path 1401 of the waveguide 1305. Since the LSI chip 1302 is implemented in the optical interconnection device 1301 as illustrated in FIG. 13, data transfer between the chips 1302 can be speedily carried out in a parallel manner using optical signals.

(Seventh Embodiment)

Figure 15:
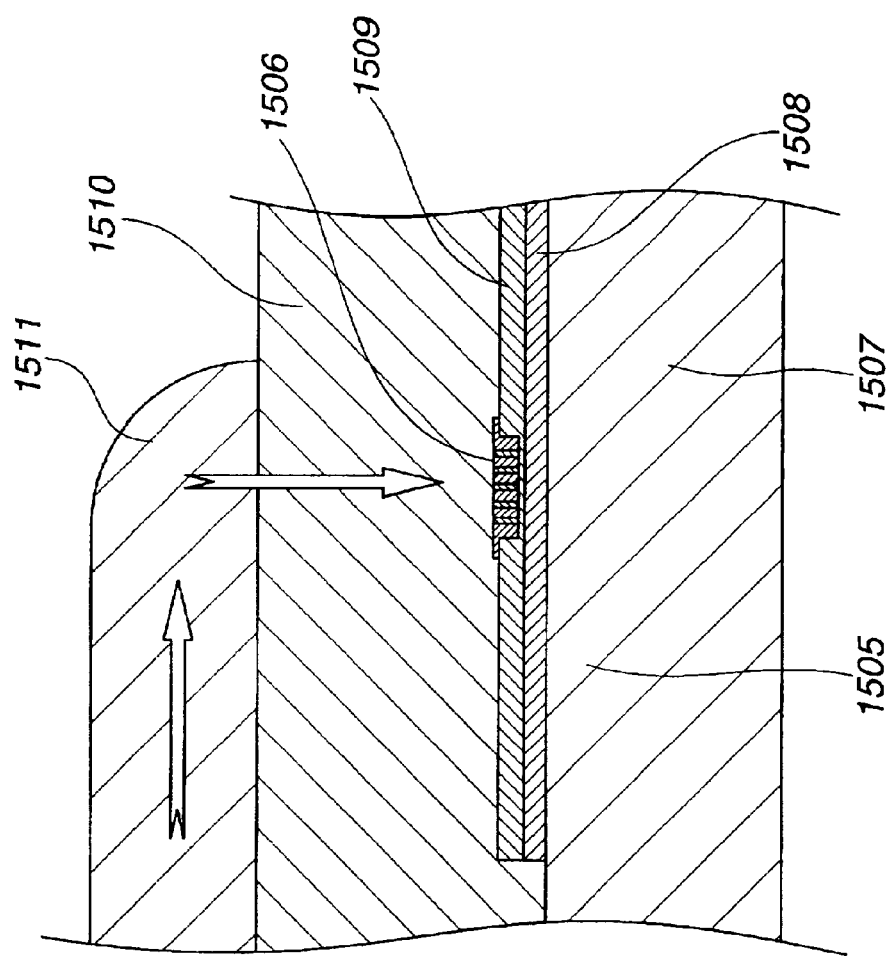
FIG. 15 is a partly-cut-away cross-sectional view illustrating yet another optical interconnection device using a waveguide of the present invention, which is integrated with a light emitting device and a light receiving device.

As a light emitting device according to a fourth embodiment, a surface emitting laser of a 0.98-μm band is used. As illustrated in FIG. 15, a surface emitting laser chip 1501 has a construction in which a structure sandwiching a one-wavelength cavity with an InGaAs/GaAs strained dual quantum well active layer and an AlGaAs spacer layer between DBR mirrors of a-quarter-wavelength AlAs/AlGaAs multiple layers is epitaxially grown on a GaAs substrate 1502. An annual recess extending down to the active layer is then formed by etching to form a current constricting structure for restricting a current flow into a light radiating region 1503. The recess is filled with polyimide, and the polyimide is flattened. Here, only the AlAs layer on the side surface of the DBR mirror exposed by etching may be selectively oxidized to further promote the current constriction. This may also be adopted in the sixth embodiment. In the seventh embodiment, an oscillation wavelength of the laser 1501 is 0.98 μm, so light therefrom can transmit through the GaAs substrate 1502. A window is opened in an electrode 1504 to emit light from the surface emitting laser 1501 through the electrode 1504. A Schottky-barrier field effect transistor (FET) (not shown) is also integrated on the same substrate 1502. This FET acts as a transistor for driving the surface emitting laser 1501.

Further, as illustrated in FIG. 15, a Schottky-barrier photodiode 1505 is used as the light receiving device. A comb-shaped electrode 1506 is formed on a semiconductor substrate as illustrated in FIG. 15 to construct a highly-sensitive fast photodetector which is called a metal-semiconductor-metal (MSM) photodiode. In this embodiment, an undoped GaAs buffer layer 1508 with a thickness of 1.5 μm is epitaxially grown on a semi-insulating GaAs substrate 1507, and a window region is formed after an insulating layer 1509 of $SiN_x$ is layered. The comb-shaped electrode 1506 as illustrated in FIG. 15 is thus fabricated. Similarly to the sixth embodiment, the MSM photodiode 1505 is formed at a position corresponding to a light output end of a waveguide 1511.

The thus-fabricated light emitting and receiving devices are implemented on a Si wafer, similarly to the sixth embodiment.

A method of fabricating the waveguide 1511 will now be described. A quartz glass substrate with a 6-inch square is used as a substrate for electroplating. An Ni electroplating bath is used. The size of substrate and opening are the same as those in the sixth embodiment. An electrode layer of Ti and Au for forming a mold are then formed directly on the substrate with the plated layer (see FIG. 5D), without forming the sacrificial layer of FIG. 5E. Another electroplating is then performed using the above wafer as the base. The electrode layer for forming a mold is used as a cathode, and an Au electroplating bath containing potassium gold cyanide, phosphoric acid-potassium hydride, chelating agent and brightener is used. The Au electroplating is thus performed at the bath temperature of 40° C. and the cathode current density of 1 A/dm². A mold of Au is formed on the substrate with the plated layer (see FIG. 6A).

A process of separating the mold will now be described. The substrate is initially removed by a mixture solution of hydrogen fluoride and ammonium fluoride, and the electrode layer is removed by ion milling using Ar. Thereafter, the wafer is immersed in a solution of tetramethyl ammoniumhydroxide (TMAH) to remove the mask layer of polyimide. The substrate, electrode layer and mask layer are thus removed, and the mold with the semicylindrical structure embedded therein is fabricated. Finally, the mold is immersed in a solution of sulfuric acid heated to 80° C. to remove the semicylindrical structure of the Ni plated layer by etching. The mold as illustrated in FIG. 6C is thus fabricated.

Aromatic polyamide acid solution is then dropped and spin-coated on the Si wafer with the surface emitting laser 1501 and the MSM photodiode 1505 implemented thereon, and this coating is thermally treated to form a cladding layer 1510 of polyimide as illustrated in FIG. 15. Another aromatic polyamide acid solution is coated on the above-described mold, and this coating is pressed and thermally cured on the cladding layer 1510. The refractive index of polyimide of the core 1511 is higher than that of a material of the cladding layer 1510.

According to this embodiment, there is provided a compact optical interconnection device consisting of integrated light emitting device, light receiving device, electronic circuit and waveguide, whose yield is excellent.

(Eighth Embodiment)

In an eighth embodiment of the present invention, a silicon-on-insulator (SOI) is used as a substrate for a waveguide and an implementation substrate of an optical device and an electronic device. Similarly to the sixth and seventh embodiments, output light emitted from a surface emitting laser propagates along the waveguide, and is detected by a photodiode.

Figure 16:
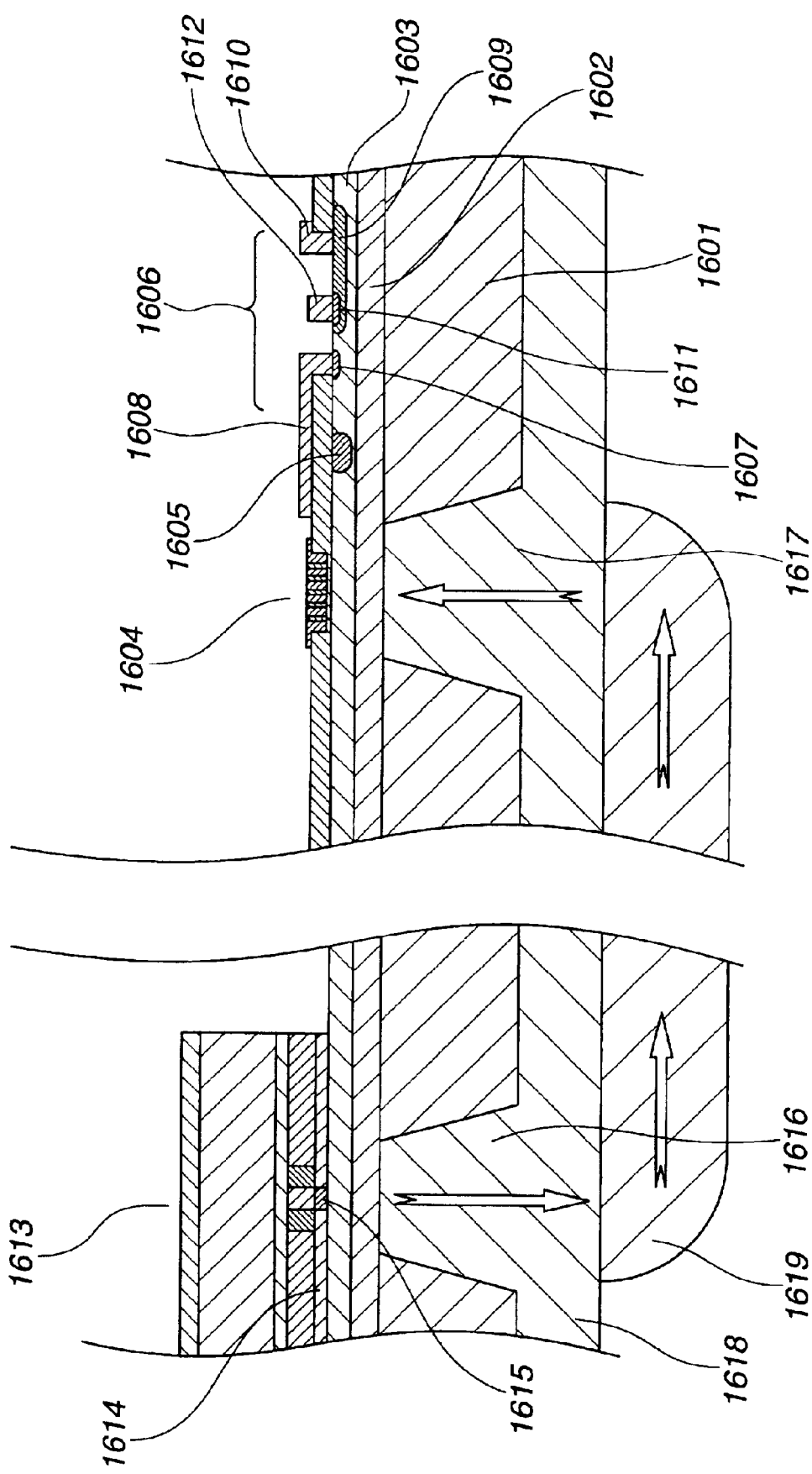
FIG. 16 is a partly-cut-away cross-sectional view illustrating yet another optical interconnection device using a waveguide of the present invention, which is integrated with a light emitting device and a light receiving device.

As illustrated in FIG. 16, similarly to the seventh embodiment, an MSM photodiode 1604 is formed on an SOI substrate in which an insulating SiO₂ layer 1602 and an undoped Si layer 1603 of about 0.3 μm in thickness are formed on a Si substrate 1601. Further, a p-diffused layer 1605 for separating devices from each other is formed, and a bipolar transistor 1606 for driving the surface emitting laser is integrated on the SOI substrate. In the transistor 1606, an n-diffused layer 1607 is formed on the Si layer 1603 to form a collector electrode 1608, a p-diffused layer 1609 is formed on the Si layer 1603 to form a base electrode 1610, and another n-diffused layer 1611 is formed on the Si layer 1603 to form an emitter electrode 1612.

In this embodiment, the light emitting device is a surface emitting laser chip 1613, which is fabricated by epitaxially growing an AlGaAs/GaAs active layer with a bandgap wavelength of 0.77 μm on a GaAs substrate. The laser chip 1613 is implemented on the SOI substrate 1601 to 1603. A window region 1615 is formed in an electrode 1614 for light emission therethrough. Furthermore, a portion of the Si substrate 1601 is etched down to the SiO₂ layer 1602 to form openings 1616 and 1617. Light emitting and receiving can be thus achieved through the bottom surface of the SOI substrate.

On the bottom surface of the SOI substrate, a waveguide consisting of a cladding layer 1618 and a core 1619 is formed. When an integrated circuit is formed directly on the SOI substrate 1601 to 1603 in this embodiment, light is used as a portion of the wiring in the chip. Optical connection is very effective especially between transistors spaced apart by a long wiring distance, in which problems of a decrease in transmission speed and an increase in required electric power are serious as the wiring is narrowed. The waveguide can be used between chips or boards, as well as in a chip.

(Ninth Embodiment)

Figure 17:
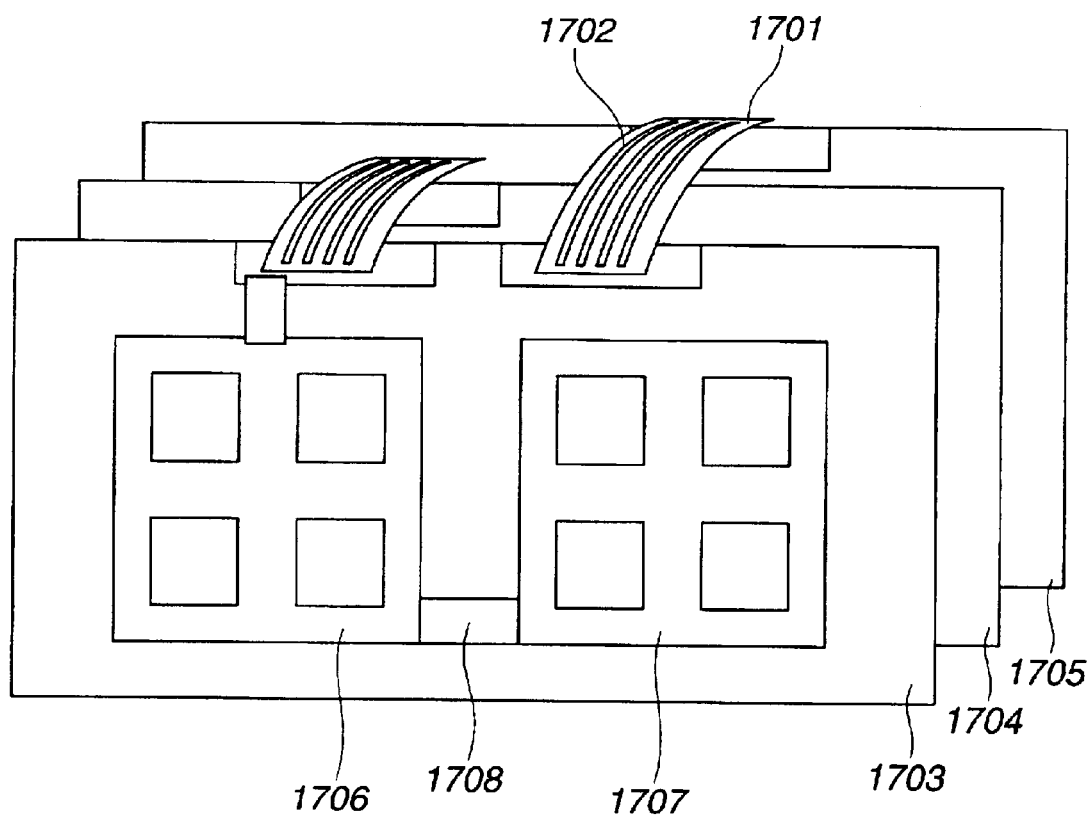
FIG. 17 is a view illustrating an optical interconnection device using a waveguide of the present invention, which is constructed in a board and between boards.

In the above embodiments, the waveguide is affixed to a substrate. The waveguide, however, can also be formed on a flexible substrate or sheet. FIG. 17 illustrates such an example.

In FIG. 17, a waveguide 1702 is fabricated on a flexible sheet 1701, and optical interconnection is effected between boards 1703, 1704, and 1705. Optical interconnection is also achieved between MCMs 1706 and 1707 through a waveguide 1708.

In the above embodiments, devices of InGaAs/GaAs series and AlGaAs/GaAs series on a GaAs substrate are used as the light emitting device. Devices of other material and wavelength, such as a blue-radiation device of GaN series, and devices of long-wavelength material (such as GaInNAs and GaAsSb) on a GaAs substrate, can also be used for the same purpose. When a device of a long-wavelength band, such as 1.3 μm or 1.55 μm, is used, a light receiving device formed of InGaAs or Ge is preferably used since Si is transparent to such a wavelength.

Furthermore, although a surface emitting laser is used as the light emitting device in the above embodiments, an end face light-emitting-type laser can also be used. A light emitting diode (LED) is naturally preferable since an LED is also a surface emitting type.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. An optical waveguide comprising:
   a partial cylindrical portion having an elongated profile and being formed of a material transparent to light propagating along said partial cylindrical portion; and
   a plurality of end portions, each of said plurality of end portions having an approximately partial spherical profile smoothly joining said partial cylindrical portion, and being formed of a same material as the material of said partial cylindrical portion,
   whereby light propagates along said partial cylindrical portion and said plurality of end portions and is substantially reflected at a boundary surface contouring said partial cylindrical portion and said plurality of end portions.

2. An optical waveguide according to claim 1, wherein said partial cylindrical portion includes a curved part having an approximately partial spherical profile smoothly joining a pair of straight partial cylindrical parts of said partial cylindrical portion.

3. An optical waveguide according to claim 1, wherein said partial cylindrical portion includes a crossing part having an approximately partial spherical profile smoothly joining a plurality of straight partial cylindrical parts of said partial cylindrical portion.

4. An optical waveguide according to claim 1, further comprising a cladding portion in contact with at least a part of a core consisting of said partial cylindrical portion and said plurality of end portions, said cladding portion being formed of a material having a refractive index lower than a refractive index of said core.

5. An optical waveguide according to claim 4, wherein said cladding portion includes a flat substrate in contact with at least a part of a flat boundary surface of said core.

6. An optical waveguide according to claim 5, wherein said partial cylindrical portion, said plurality of end portions, and said substrate are formed such that light perpendicularly incident on said substrate through said plurality of end portions propagates along said partial cylindrical portion.

7. An optical waveguide according to claim 5, wherein said partial cylindrical portion, said plurality of end portions, and said substrate are formed such that light propagating along said partial cylindrical portion emerges perpendicularly to said substrate through said plurality of end portions.

8. An optical waveguide according to claim 1, wherein said partial cylindrical portion and said plurality of end portions are formed of a resin material.

9. An optical waveguide according to claim 1, wherein said partial cylindrical portion and said plurality of end portions are formed of a glass material.

10. An optical waveguide according to claim 1, wherein said partial cylindrical portion and said plurality of end portions are formed on one of a resin substrate, a glass substrate, a quartz substrate, and a semiconductor substrate.

11. An optical waveguide according to claim 10, wherein said substrate is a flexible substrate.

12. An optical interconnection device comprising:
   a waveguide including:
      a partial cylindrical portion, which has an elongated profile, and is formed of a material transparent to light propagating along said partial cylindrical portion; and
      a plurality of end portions, each of said plurality of end portions having an approximately partial spherical profile smoothly joining said partial cylindrical portion, and being formed of a same material as a material of said partial cylindrical portion, whereby light propagating along said partial cylindrical portion and said plurality of end portions is reflected at a boundary surface contouring said partial cylindrical portion and said plurality of end portions; and
   a substrate with at least one of a light emitting device and a light receiving device disposed on said substrate, said plurality of end portions being positioned at a portion of said substrate corresponding to a position at which one of said light emitting device and said light receiving device is disposed.

13. An optical interconnection device according to claim 12, wherein said light emitting device includes a surface emitting laser, which is composed of semiconductor crystal and includes an active layer sandwiched between a pair of reflective mirrors.

14. An optical interconnection device according to claim 12, wherein said light emitting device includes a light emitting diode (LED), which is composed of a semiconductor crystal material and includes at least one of a pn junction and a pin junction.

15. An optical interconnection device according to claim 12, wherein said light receiving device comprises a pin photodiode.

16. An optical interconnection device according to claim 12, wherein said light receiving device includes a metal-semiconductor-metal (MSM) optical detector.

17. An optical interconnection device according to claim 12, wherein said substrate is a semiconductor substrate on which an electronic circuit for driving and controlling said light emitting device is integrated, and said light emitting device is coupled with said semiconductor substrate.

18. An optical interconnection device according to claim 12, wherein said substrate is a semiconductor substrate on which an electronic circuit for amplifying and controlling said light receiving device is integrated, and said light receiving device is coupled with said semiconductor substrate.

19. An optical interconnection device according to claim 12, wherein said waveguide optically connects a plurality of semiconductor circuit chips, each of said circuit chips being formed on said substrate.

20. An optical interconnection device according to claim 12, wherein said waveguide optically connects a plurality of chip modules, wherein in each chip module a plurality of semiconductor circuit chips is implemented.

21. An optical interconnection device according to claim 12, wherein said waveguide forms an optical wiring on a circuit board in which a semiconductor circuit chip and a chip module are implemented in a mixed configuration.

22. An optical interconnection device according to claim 12, wherein said waveguide optically connects circuit boards in which at least one of a semiconductor circuit chip and a chip module is implemented.

23. An optical waveguide fabricated from a light-transmissive material comprising:
   a first region having a partial cylindrical shape; and
   a second region having a partial spherical shape, said second region being provided at an end of said first region,
   whereby a spherical profile of said second region acts as a concave mirror.

24. An optical interconnection device comprising:
   a light emitting device;
   a light receiving device; and
   an optical waveguide for optically connecting said light emitting device and said light receiving device, said optical waveguide fabricated from a light-transmissive material and including a first region having a partial cylindrical shape, and a second region having a partial spherical shape, said second region being provided at an end of said first region,
   whereby a spherical profile of said second region acts as a concave mirror.

25. An optical interconnection device comprising:
   an optical device; and
   an optical waveguide optically connected to said optical device, said optical waveguide fabricated from a light-transmissive material and including a first region and a second region,
   wherein said first region has a partial cylindrical shape, and said second region has a partial spherical shape, and is provided at an end of said first region,
   whereby a spherical profile of said second region acts as a concave mirror.

* * * * *

UNITED STATES PATENT AND TRADEMARK OFFICE
CERTIFICATE OF CORRECTION

PATENT NO. : 6,868,214 B1  Page 1 of 1
DATED : March 15, 2005
INVENTOR(S) : Hajime Sakata et al.

It is certified that error appears in the above-identified patent and that said Letters Patent is hereby corrected as shown below:

<u>Title page,</u>
Insert Item -- [30] Foreign Application Priority Data
　　　　　July 30, 1999 [JP]　　Japan .... 11-216193 --.

<u>Column 1,</u>
Line 67, "proposed" should read -- been proposed --.

<u>Column 2,</u>
Line 25, "slantes" should read -- slanted --.

<u>Column 3,</u>
Line 53, "device is." should read -- device is united. --.

<u>Column 6,</u>
Line 38, "conducted" should read -- conducted, --.

<u>Column 10,</u>
Line 30, "deposited" should be deleted; and
Line 35, "before" should read -- deposited before --.

<u>Column 12,</u>
Line 18, "of of" should read -- of --.

<u>Column 13,</u>
Line 39, "whith" should read -- with --.

Signed and Sealed this

Twenty-first Day of March, 2006

JON W. DUDAS
*Director of the United States Patent and Trademark Office*